United States Patent
Hausman

(10) Patent No.: US 8,391,781 B2
(45) Date of Patent: Mar. 5, 2013

(54) MEASURING SATELLITE LINEARITY FROM EARTH USING A LOW DUTY CYCLE PULSED MICROWAVE SIGNAL

(75) Inventor: Howard Hausman, Hauppauge, NY (US)

(73) Assignee: Miteq, Inc, Hauppauge, NY (US)

( * ) Notice: Subject to any disclaimer, the term of this patent is extended or adjusted under 35 U.S.C. 154(b) by 203 days.

(21) Appl. No.: 12/883,146

(22) Filed: Sep. 15, 2010

(65) Prior Publication Data

US 2011/0064127 A1 Mar. 17, 2011

(51) Int. Cl.
*H04L 27/00* (2006.01)
*H03D 1/00* (2006.01)
*H04B 7/185* (2006.01)

(52) U.S. Cl. ....... 455/12.1; 375/295; 375/340; 375/358; 375/221; 375/219

(58) Field of Classification Search ............... 455/12.1; 375/295, 340, 358, 221, 219
See application file for complete search history.

(56) References Cited

U.S. PATENT DOCUMENTS

| | | | |
|---|---|---|---|
| 4,038,600 A | | 7/1977 | Thomas |
| 4,320,503 A * | | 3/1982 | Acampora ............... 370/324 |
| 6,212,360 B1 | | 4/2001 | Fleming et al. |
| 6,853,244 B2 | | 2/2005 | Robinson et al. |
| 6,922,103 B2 | | 7/2005 | Cheung et al. |
| 6,982,593 B2 | | 1/2006 | Robinson et al. |
| 7,043,213 B2 | | 5/2006 | Robinson et al. |
| 7,054,391 B2 | | 5/2006 | Thesling |
| 7,061,991 B2 | | 6/2006 | Wright et al. |
| 7,230,480 B2 | | 6/2007 | Chen et al. |
| 7,466,756 B2 | | 12/2008 | Thesling |
| 7,502,429 B2 | | 3/2009 | Chen |
| 7,502,430 B2 | | 3/2009 | Chen |
| 7,579,908 B2 | | 8/2009 | Miaille et al. |
| 7,580,476 B2 | | 8/2009 | Robinson et al. |
| 7,634,021 B2 | | 12/2009 | Thesling |
| 7,773,688 B2 | | 8/2010 | Sorrells et al. |
| 2005/0032472 A1* | | 2/2005 | Jiang et al. ............... 455/13.4 |
| 2007/0135058 A1* | | 6/2007 | Ma et al. ............... 455/69 |
| 2008/0013163 A1* | | 1/2008 | Leonardo et al. ......... 359/341.31 |
| 2008/0055151 A1 | | 3/2008 | Hudson et al. |
| 2009/0067538 A1 | | 3/2009 | Thesling |
| 2009/0256739 A1* | | 10/2009 | Teshirogi et al. ............ 342/204 |
| 2010/0118782 A1* | | 5/2010 | Baker et al. .............. 370/328 |
| 2012/0069780 A1* | | 3/2012 | Athley et al. ............... 370/280 |
| 2012/0098505 A1* | | 4/2012 | Irissou et al. ............... 323/237 |

* cited by examiner

*Primary Examiner* — Bobbak Safaipour
(74) *Attorney, Agent, or Firm* — Lackenbach Seigel, LLP; Myron Greenspan

(57) ABSTRACT

System for measuring satellite downlink amplifier linearity includes a pulsed signal generator for selectively generating low duty cycle pulses. A linear transmitter uplink amplifier is provided for amplifying the low duty cycle pulses and generating an uplink signal. An antenna transmits the amplified uplink signal to an orbiting satellite. A downlink amplifier in the satellite generates a downlink signal for re-transmission to an Earth-based antenna. A pulse receiver is provided for receiving the downlink signal and providing information regarding the transfer function of the downlink amplifier. Preferably, a delayed trigger circuit is coupled to the pulse signal generator for activating the pulsed signal generator after a time delay substantially corresponding to the propagation times of the uplink and downlink signals. By altering the duty cycles of the uplink signals while maintaining the peak power level the average powers transmitted to the downlink amplifiers can be changed to modify the power levels of the downlink signals to provide more complete information regarding the transfer functions of the downlink amplifiers.

15 Claims, 2 Drawing Sheets

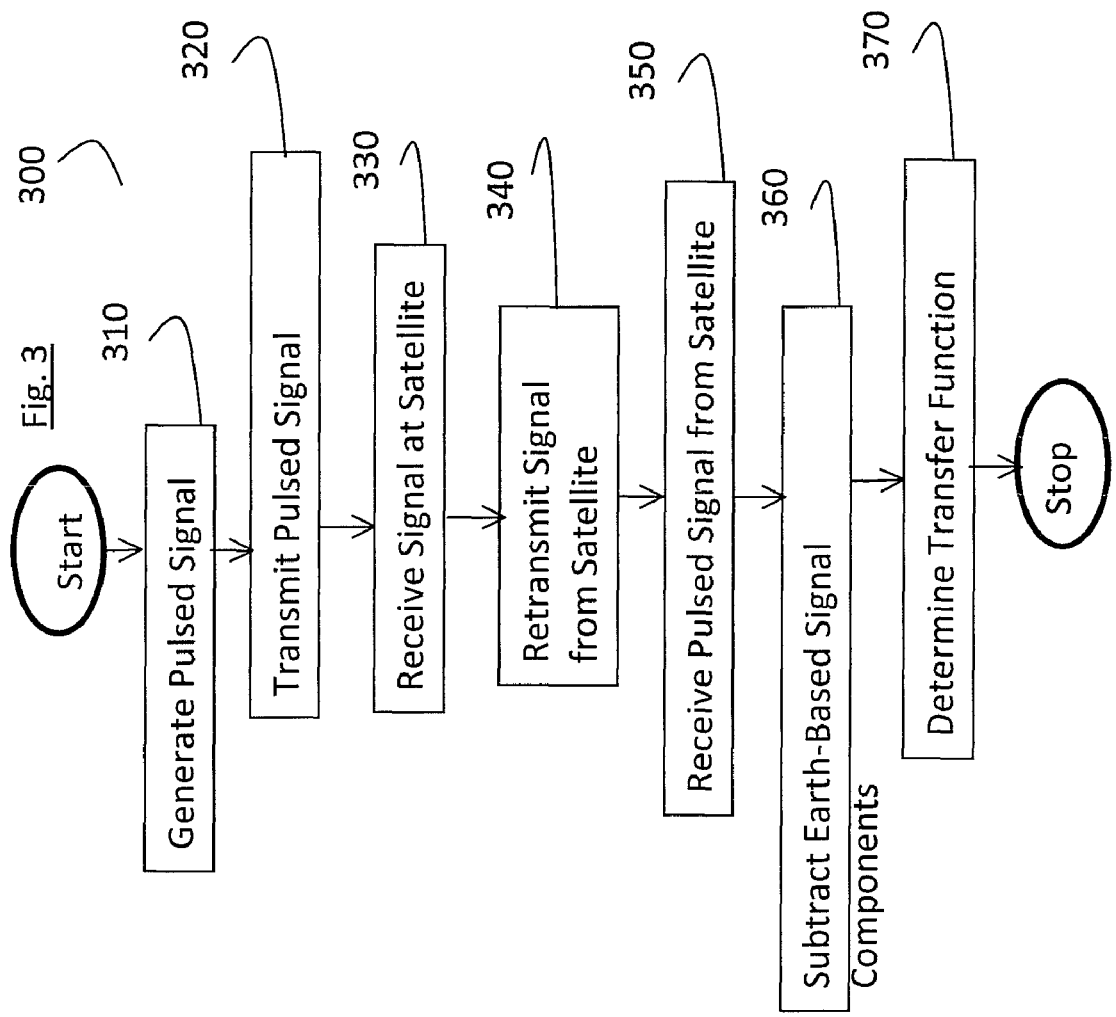

MEASURING SATELLITE LINEARITY FROM EARTH USING A LOW DUTY CYCLE PULSED MICROWAVE SIGNAL

CROSS-REFERENCE TO RELATED APPLICATION

This Application corresponds to U.S. Provisional Patent Application No. 61/242,657 filed on Sep. 15, 2009.

BACKGROUND OF THE INVENTION

1. Field of the Invention

The invention generally relates to Satellite Communication Systems and, more specifically, to equipment and method of measuring satellite linearity from earth using a low duty cycle pulsed microwave signal.

2. Description of the Prior Art

Linearity of any active device is determined by sending a Constant Wave (CW) signal to the device and measuring the resultant amplitude compression or amplitude compression and phase variation at the output of the device as the input power level is increased. Measuring the linearity of a satellite in orbit is a particularly difficult problem because the loss between the Earth station transmitter and the satellite is so extensive. Referring to FIG. 1, typical prior art testing equipment is generally designated by the reference numeral 10.

A CW signal generator 12 applies a CW signal to a CW high power saturated traveling wave tube amplifier (TWTA) 14 or a solid state power amplifier (SSPA). The output of TWTA 14 is sent to a satellite 16 by means of an Earth station antenna 18. The satellite 16 is preferably a "bent pipe" satellite. Most transponders are satellite communication channels that operate on a "bent pipe" principle. Such transponders send back signals that are received by a satellite with amplification, phase shift and frequency shift from the uplink to downlink frequency. The downlink signal is received by the Earth station antenna 20, the output of which is analyzed in a network analyzer 22. The TWTA 14 is used at the Earth station to transmit the signal at a sufficient power level to bring the satellite into saturation or near-saturation. Typically a high power amplifier, e.g. a traveling wave tube amplifier or a solid state power amplifier, is used at the Earth station to transmit the signal at a sufficient power level to bring the satellite into saturation or near saturation, as suggested in FIG. 1.

A system similar to the one described is disclosed in U.S. Pat. No. 4,038,600 to Thomas for a power control on satellite uplinks. This patent discloses a communications system using a linear transponder and the intermodulation products generated by the transponder to produce a control signal for controlling the output power of a transmitter such that the power level of the input signal to the transponder is maintained at a desired level. Intermodulation products are used to determine the power level of the input signal to the transponder. However, the system disclosed in this patent uses a test signal generator at the transmitter station that generates an unmodulated carrier in the form of a continuous CW signal. Because a continuous CW signal is used the average power transmitted is limited. This, in turn, limits the extent to which the satellite amplifiers can be saturated. As such, only a limited amount of information can be obtained about the transfer function of the satellite amplifiers based on the relatively low CW signals that can be transmitted in the uplink.

A series of related patents disclose receiver based saturation estimator circuits. In U.S. Pat. Nos. 7,054,391, 7,466,756, and 7,634,021 to Thesling the systems disclosed are for a method of estimating the saturation point of the transmitter from a transmitted communication signal received from the transmitter that generates a received data signal. The transmitted data signal is compared to the received data signal, and an estimate is made of the saturation level of the transmitter based on the comparison of the transmitted data signal to the received data signal. However, while these patents disclose a receiver-based saturation estimator the patents do not disclose the use of a pulsed microwave signal the duty cycle of which can be adjusted to selectively control and adjust the average power transmitted to the transponder to thereby modify the average power in the downlink amplifiers. Due to the inability to significantly modify the saturation levels of the downlink amplifiers limited information is available regarding the transfer function of those amplifiers and estimator circuits must be used to estimate the properties at saturation instead of accurately determining the same.

SUMMARY OF THE INVENTION

Accordingly, it is an object of the invention to provide a technique for measuring satellite characteristics using a low average power and a low duty cycle pulse microwave signal.

It is another object of the invention to provide a method of as in the previous object measuring the resultant amplitude compression and phase variation at the output of a satellite as the input power level is increased.

It is still another object of the invention to provide a system for measuring the linearity of a satellite in orbit in a simpler and less costly manner.

It is yet another object of the invention to provide a technique as suggested in the previous objects that provides accurate results.

It is further object of the invention to provide a system for measuring satellite linearity from Earth without the use of a constant wave (CW) signal.

It is still further object of the invention to provide a system for measuring accurate properties of transfer functions of downlink amplifiers by utilizing pulsed microwave signals that selectively adjust their degree of saturation and examining the properties of the downlink signals at each stage of saturation.

It is yet a further object of the invention to provide a system as in the previous object in which the pulsed microwave signals are adjustable to enable the adjustment of pulse width and, therefore, the average transmitted power, thereby enabling measurements of the amplifier characteristics without the possibility of burning out the amplifiers due to over dissipation caused by high output average power levels.

It is an additional object of the invention to provide a system and method as in the previous objects that avoids requirements for estimation circuitry by enabling a direct comparison of the transfer functions of the uplink and downlink amplifiers to provide accurate information regarding the transfer function of the downlink amplifiers without the need for estimating same.

It is yet an additional object of the invention to provide a method of characterizing High Power Amplifiers (HPA), such a Traveling Wave Tube amplifiers (TWTA) and an Solid State Power amplifiers (SSPA) for ground equipment using a pulse microwave signal instead of a Constant Wave (CW) signal when the HPA cannot survive the heat generated when a CW signal is at the devices maximum rated output power. These HPAs are normally operated at average power less than half of their rated powers, but many communication signals or multiple communication signals have high peak to average ratios and therefore require linearization at powers considerably higher than the signals average power. To linearize these devices it is desirable to characterize the device up to its rated power (above its average power). This can be accomplished by using a low duty cycle pulsed microwave signal and measuring the device characteristics during the intra-pulse period. The linearizer can then be tuned to have a compensating characteristic through the peak of the waveform. This improves the pre-distortion and allows the HPA to transmit linear communication signals at higher powers with lower distortion than was previously possible.

BRIEF DESCRIPTION OF THE DRAWINGS

The above and other objects, features and advantages of the present invention will be better understood from the following specification when read in conjunction with the accompanying drawings.

FIG. 3 is a flow chart illustrating the method steps in using the system shown in FIG. 2.

DETAILED DESCRIPTION OF A PREFERRED EMBODIMENT

Figure 1:
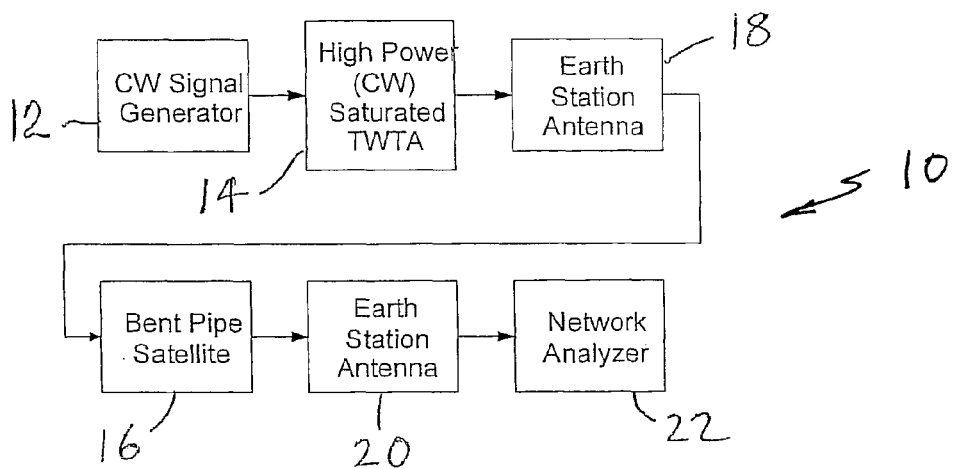
FIG. 1 is a block diagram illustrating a typical prior art method used for analyzing satellite characteristics using a high power CW TWTA.
Figure 2:
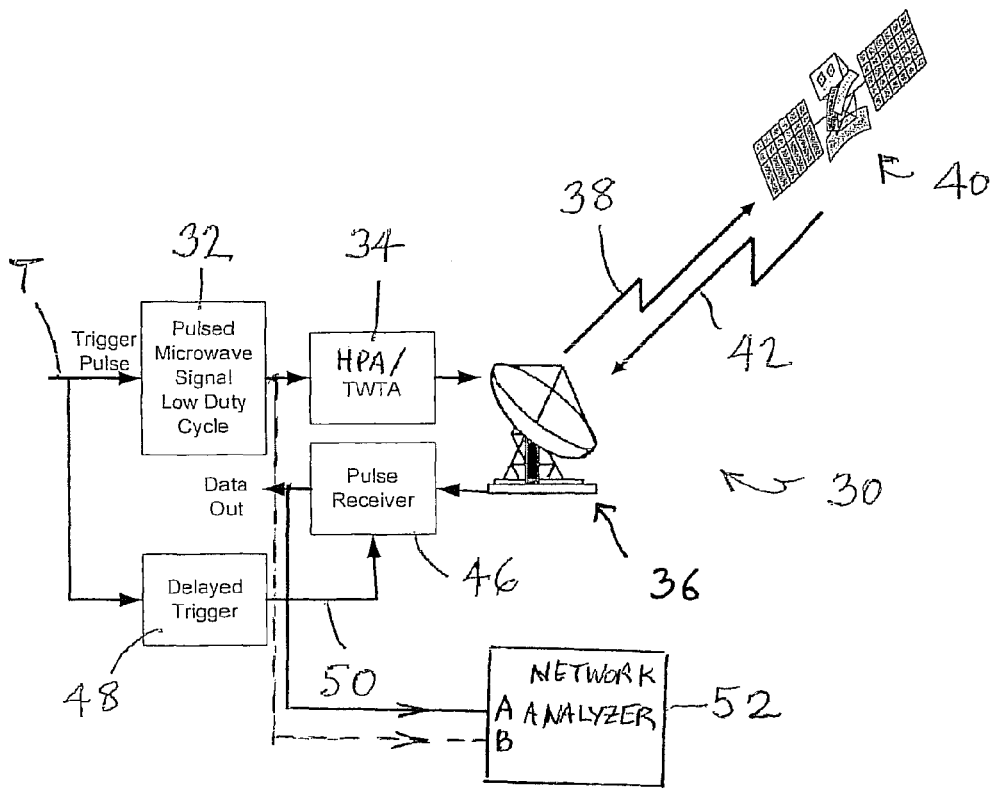
FIG. 2 is a schematic block diagram illustrating a system in accordance with the present invention for measuring satellite characteristics using a low average power TWTA in a low duty cycle pulse microwave signal.

Referring to FIG. 2, the system of the invention for measuring satellite linearity from Earth using a low duty cycle pulsed microwave signal is generally designated by the reference numeral 30.

The system 30 includes a source of trigger pulses T (not shown) that are input to a pulsed microwave signal low duty cycle generator 32, the output of which is applied to a TWTA 34. The TWTA 34 can be operated in the linear or the non-linear mode with a pre-distortion circuit (not shown) correcting the power amplifier on Earth and in the satellite. In addition, the power amplifier 34 can be a solid state power amplifier (SSPA) or any other suitable high power amplifier (HPA) which may be a TWTA or a SSPA.

The output of the TWTA is fed to an antenna 36 that can transmit uplink signals 38 to a satellite 40 and receive downlink signals 42. When the downlink signals are received, they are fed to a pulse receiver 46, the pulse receiver 46 also receiving the output of a delayed trigger generator 48 that outputs trigger pulses 50. Delayed trigger generator 48 is itself triggered or synchronized by the same trigger pulses T that are fed to the pulsed microwave signal low duty cycle generator 32.

The "Data Out" signals at the output of the pulse receiver are output to a network analyzer 52 input A for computing both the small or linear small signal as well as the large or non-linear amplitudes and phases. Optionally, depending on the analyzer used, the pulsed signals at the output of generator 32 are input to input B of the analyzer so that the signal parameters can be compared and the transfer function of the downlink amplifiers can be accurately determined.

Thus, the system 30 utilizes a low duty cycle pulsed microwave signal instead of a CW signal to measure the satellite's linear characteristics. The advantage of this technique is that higher peak powers are attainable and therefore improve the measurements of the satellite's characteristics. The average power transmitted is significantly less than that required for a CW measurement and, therefore, the technique allows the measurement to be made using lower cost more available high power amplifiers.

The Earth station pulse receiver 46 is designed to measure the intra-pulse characteristics, amplitude or amplitude and phase when triggered by the pulsed microwave signal generator. The trigger pulse applied to the pulse receiver is delayed by the amount of time it takes the signal to travel to the satellite and return to Earth. This signal turns on the pulse receiver only during the expected time of signal arrival. The pulse receiver during this time measures the amplitude or the amplitude and phase characteristics of the signal from the satellite. By increasing the transmitted power a plot of amplitude or amplitude and phase characteristics of the returning signal can be measured. By subtracting out the parameters of the transmitted power amplifier located at the earth station the true transmission characteristics of the satellite can be obtained.

In accordance with the preferred embodiment, the pulsed microwave signal generator 32 can be adjusted to modify the duty cycle of the pulses applied to the linear TWTA 34. By narrowing the pulse width while maintaining a substantially constant average power, the peak power of the pulse can be increased while the average power is kept substantially constant. This allows the system to regulate the output levels of the downlink amplifiers in the satellite 40. By repeating the test at different levels of average power and, therefore, different test conditions, additional data can be obtained regarding the large signal or "S" parameters of the downlink amplifiers. This, in turn, permits the parameters of the transfer function to be more accurately determined by the network analyzer 52 without the need for saturation estimators. The "Data Out" of the pulse receiver 46 contains data required, within the period of the pulses, including the amplitude and phase of the received signals for any given output average power levels of transmitted power, this information reflecting upon and determining the linearity of the downlink amplifiers.

Therefore, the method of the invention, using the system in FIG. 2, involves estimating the saturation point of the downlink amplifiers, for example on the basis of determinations made while the amplifiers are still on the ground, and determining the average power for a given device. The pulse width can be adjusted to modify the average transmitted power in a satellite or transmitting Earth station power amplifiers enabling measurement of the amplifier characteristics is without the possibility of damaging the amplifiers by burning them out due to over dissipation caused by high output average power levels. The "Data Out" is reviewed at each different power level and the information is used to more accurately determine the details of the transfer function of the downlink amplifier. This information may, in turn, be used to increase or decrease the levels the uplink signals without unduly distorting these signals or information carried therein. The "Data Out" can be used to manually adjust the levels of the uplink signals or any known or suitable control circuit, such as the one suggested in the Thomas U.S. Pat. No. 4,038,600 patent, may be used to adjust the levels automatically.

Referring to FIG. 3, a flow chart is illustrated representing the steps in implementing the measurement of satellite linearity using the system shown in FIG. 2. The method (300) is initiated by generating pulsed signals (310), at the pulse generator (32) in FIG. 2. The pulsed signals are generated in response to the Trigger pulses, as described. The pulsed signals (38) are then transmitted (320) to an orbiting satellite or transponder (40). As indicated, this normally occurs after the pulsed signals are amplified in the linear TWTA (34). The pulsed amplified signals are received (330) by the satellite (40), which retransmits (340) the signal (42) from the satellite and it is received (350) by the land-based antenna (36). The receive signals at the pulse receiver (46) result in "Data Out" which is fed to a network analyzer (52), where the Earth-based signal components are subtracted (360) and the transfer function of the downlink amplifier is determined (370). By repeating this measurement at different duty cycles and different peak powers both linear, small signal properties or characteristics as well as the non-linear, large signal properties or parameters can be determined in any suitable network analyzer or computational box, such as a computer, that can compare the amplitudes and phase shifts between the outgoing signals and the incoming signals. The variations, primarily produced by the transfer function of the downlink amplifier and the satellite can then be better and accurately determined.

Thus, the technique can be used for finding the characteristics of a high power amplifier (HPA)—inclusive of linear and non-linear characteristics or parameters. There are many HPA's that cannot operate at their rated CW power and it is necessary to use other techniques to measure their transfer properties.

An HPA can be specified in both peak power and average power (i.e. CW power), and these can be the same. In the case where they are different, characterization can be analyzed using "low-duty-cycle signal", as described, to characterize the pulse transfer characteristic of an HPA (phase and magnitude/gain)—both linear and non-linear. Amplifiers (TWT or solid state) will burn out if run at CW (high power)—thus they are operated at pulsed conditions. The use of pulse allows Pulse Peak measurement. By varying the average power in the linear and in the saturation regions extensive information can be ascertained about the transfer functions of the components being measured. Such measurements also apply to any amplifier that cannot operate at its rated/specified average power.

The lower limit of the pulse width is limited by the bandwidth of the transmitter and/or receiver device. As indicated, the method is run at multiple power levels—for full characterization of a device/system. It is a method of measuring transfer characteristics of power amplifiers up to peak power level (beyond average power levels).

The curve from an average power level up to a peak power level may be described by a polynomial. The polynomial is a description of an amplifier under measurement. A minimum of two data points may be necessary for a polynomial characterization. If the order of the polynomial is N, then N+1 data points may be used to find the polynomial. A $1^{st}$ order polynomial is a minimum order—thus 2 data point minimum are required.

Each measurement must be for gain and phase (at each data point). As the number of data points increases, the accuracy of the characterization of the power amplifier increases. Data points are used to generate a polynomial using both gain and phase—these are descriptive of the characteristics of the PA. A distinctive characteristic is the use in a non-linear region of amplifier—above (higher) than amp's rated average power.

The pulse width (PW) is less than a device parameter—i.e. the thermal time constant.

Distortion Characterization Method:
Measure satellites under peak power conditions
Use low duty cycle pulsed microwave signals to measure saturation characteristics of a "bent pipe" (configured/typical) satellite.
Could be referred to as "Pulse Modulation"—with 100% modulation.

TWT amplifier/linear amplifier—then modulation may be created with i.e. a switch Method in accordance with the invention:
Compare return wave to transmitted wave (minus delay and/or frequency offset)—difference between the two=distortion.
Also, can subtract distortion characteristics of transmitter
Possibility of multiple measurements—may be used to calibrate out atmospheric effects. Purpose of pulse:
 a. CW—does not operate at peak power—due to physical equipment limitations—i.e. TWT may overheat.
 b. Pulse—at narrow (short intervals) time segments peak power can be transmitted. Intervals are less than the thermal time constant (of amp)
 c. ON-to-OFF ratio—low level such that average power does not exceed power rating of TWT tube and/or transmitter
 d. Average power may be determined by time at peak and (time and level) when switched off-peak—i.e. ON/OFF ratio may be 6 dB, 10 dB or 20 dB difference.

Peak power—present in actual operation—exceeds CW power operations.
Use of peak power—more closely resembles actual operational conditions
Efficiency of satellite operations
Satellite can handle higher: average power when peak power performance is known (accurately)—i.e. intercept point versus compression point and/or saturation point.
Allows measurements of amplifier non-linearities.
Can operate with less margin if known that higher average power impinging on transponder with less distortion.
Estimate CW power based on estimate of peak power—then "back-off" by a fixed number—i.e. 6 dB.
With an ability to measure peak power characteristics—can operate closer to peak—can better/more accurately define a required back-off for any given (specific) space-based transponder.

Thus, the invention provides a method of characterizing High Power Amplifiers (HPA), such a Traveling Wave Tube amplifiers (TWTA) and an Solid State Power amplifiers (SSPA) for ground and space borne equipment using a pulse microwave signal instead of a Constant Wave (CW) signal when the HPA cannot survive the heat generated when a CW signal is at the devices maximum rated output power. These HPAs are normally operated at average power less than half of their rated powers, but many communication signals or multiple communication signals have high peak to average ratios and therefore require linearization at powers considerably higher than the signals average power. To linearize these devices it is desirable to characterize the device up to its rated power (above its average power). This can be accomplished by using a low duty cycle pulsed microwave signal and measuring the device characteristics during the intra-pulse period. The linearizer can then be tuned to have a compensating characteristic through the peak of the waveform. This improves the pre-distortion and allows the HPA to transmit linear communication signals at higher powers with lower distortion than was previously possible.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. System for measuring satellite downlink amplifier linearity comprising a pulsed signal generator for selectively generating a low duty cycle pulse;
   a linear transmitter uplink amplifier for amplifying said low duty cycle pulse and generating an uplink signal;
   an antenna for transmitting the amplified uplink signal to an orbiting satellite;
   a downlink amplifier having a transfer function in the satellite for generating a downlink signal for re-transmission to an Earth-based antenna; and
   a pulsed receiver for receiving said downlink signal and providing information regarding said transfer function of said downlink amplifier.

2. A system as defined in claim 1, further comprising trigger means coupled to said pulsed signal generator for activating said pulsed signal generator.

3. System for measuring satellite downlink amplifier linearity comprising a pulsed signal generator for selectively generating a low duty cycle pulse;
   a linear transmitter uplink amplifier for amplifying said low duty cycle pulse and generating an uplink signal;
   an antenna for transmitting the amplified uplink signal to an orbiting satellite;
   a downlink amplifier having a transfer function in the satellite for generating a downlink signal for re-transmission to an Earth-based antenna; and
   a pulsed receiver for receiving said downlink signal and providing information regarding said transfer function of said downlink amplifier;
   trigger means coupled to said pulsed signal generator for activating said pulsed signal generator;
   a delayed trigger circuit for triggering said pulsed receiver and,
   said delayed trigger circuit being connected to said trigger means for actuating said pulsed receiver after a time delay substantially corresponding to the propagation times of said uplink and downlink signals.

4. A system as defined in claim 1, wherein said linear transmitter comprises a traveling wave tube amplifier (TWTA).

5. A system as defined in claim 1, wherein said pulsed receiver has an output port that issues information reflecting on said transfer function of said downlink amplifier.

6. A system as defined in claim 1, wherein said pulsed signal generator is adjustable for adjusting a duty cycle or relative width of a low duty cycle pulse and uplink signal and thus adjusting the average power in the uplink signals.

7. A system as defined in claim 1, wherein said uplink amplifier is a linear traveling wave tube amplifier (TWTA).

8. A system as defined in claim 1, wherein said uplink signal is a microwave signal.

9. A method of measuring satellite linearity from Earth comprising the steps of:
   generating pulsed low duty cycle pulse signals;
   amplifying said low duty cycle pulse to generate an uplink signal;
   transmitting said uplink signal to an orbiting satellite including a downlink amplifier having a transfer function;
   transmitting a downlink signal processed in the downlink amplifier on the satellite;
   receiving said downlink signal;
   comparing the properties of said uplink and downlink signals to determine the transfer function of said downlink amplifier.

10. A method of measuring satellite linearity from Earth comprising the steps of:
    generating pulsed low duty cycle pulse signals;
    amplifying said low duty cycle pulse to generate an uplink signal;
    transmitting said uplink signal to an orbiting satellite including a downlink amplifier;
    transmitting a downlink signal processed in the downlink amplifier on the satellite;
    receiving said downlink signal;
    comparing the properties of said uplink and downlink signals to determine the transfer function of said downlink amplifier;
    wherein said uplink and downlink signals have a predetermined transit time between an Earth station and the satellite, and delaying examination of said downlink pulse an amount substantially equal to said predetermined transit time before comparing the properties of said signals.

11. A method as defined in claim 9, further comprising adjusting the duty cycle and average power of said uplink signal to alter the average output of said downlink amplifier to limit the operating temperature and potential damage thereto.

12. A method as defined in claim 11, further comprising the step of adjusting the average power of said uplink signal while maintaining the peak power substantially constant.

13. A method as defined in claim 9, further comprising the step of repeating the measurement for uplink signals having different duty cycles and thus different average power levels.

14. A method as defined in claim 13, further comprising the step of correlating the information from said downlink signals obtained at different duty cycles of said pulsed uplink signals to progressively increase the accuracy of the parameters defining the transfer function of the downlink amplifier by performing the measurements at different saturation levels of said downlink amplifier.

15. A method as defined in claim 9, further comprising the step of using said pulsed signals to establish when said downlink amplifier is approaching a condition of maximum peak power using a continuous wave (CW) signal, whereby operation of said downlink amplifier can be safely operated at lower average power levels and damage to said downlink amplifier can be avoided.

* * * * *